US007673035B2

(12) United States Patent
Stevenson et al.

(10) Patent No.: US 7,673,035 B2
(45) Date of Patent: Mar. 2, 2010

(54) APPARATUS AND METHOD FOR PROCESSING DATA RELATING TO EVENTS ON A NETWORK

(75) Inventors: David James Stevenson, Edinburgh (GB); Hamish Donald Stuart Martin, Edinburgh (GB); Andrew Hunter Gray, West Lothian (GB); Christopher Robert Linzell, Hertfordshire (GB)

(73) Assignee: 3Com Corporation, Marlborough, MA (US)

( * ) Notice: Subject to any disclaimer, the term of this patent is extended or adjusted under 35 U.S.C. 154(b) by 919 days.

(21) Appl. No.: 09/897,518

(22) Filed: Jul. 2, 2001

(65) Prior Publication Data

US 2002/0161877 A1   Oct. 31, 2002

(30) Foreign Application Priority Data

Feb. 27, 2001   (GB) ................................. 0104872.7

(51) Int. Cl.
   *G06F 15/173*   (2006.01)
(52) U.S. Cl. ........................................ 709/224; 714/20
(58) Field of Classification Search ................ 709/223, 709/224; 714/1–4, 43, 20
   See application file for complete search history.

(56) References Cited

U.S. PATENT DOCUMENTS

| | | | | |
|---|---|---|---|---|
| 4,438,494 A | * | 3/1984 | Budde et al. ................... 714/2 |
| 4,703,481 A | * | 10/1987 | Fremont ....................... 714/17 |
| 5,029,022 A | * | 7/1991 | Odaka et al. ................... 360/48 |
| 5,223,827 A | * | 6/1993 | Bell et al. ................... 714/704 |
| 5,245,615 A | * | 9/1993 | Treu ............................ 714/45 |
| 5,434,872 A | | 7/1995 | Petersen et al. ............ 371/57.1 |
| 5,471,399 A | | 11/1995 | Tanaka et al. ............... 364/491 |
| 5,615,323 A | | 3/1997 | Engel et al. .................. 395/140 |
| 5,634,008 A | * | 5/1997 | Gaffaney et al. ............ 709/224 |
| 5,696,486 A | | 12/1997 | Poliquin et al. ............. 340/506 |
| 5,732,094 A | | 3/1998 | Petersen et al. ............ 371/51.1 |
| 5,751,964 A | * | 5/1998 | Ordanic et al. .............. 709/224 |
| 5,819,028 A | | 10/1998 | Manghirmalani et al. 395/185.1 |

(Continued)

FOREIGN PATENT DOCUMENTS

EP         0515296 A    * 11/1992

(Continued)

OTHER PUBLICATIONS

Decker et al., "Definitions Of Managed Objects For Bridges", RFC: 1493, Jul. 1993, pp. 1-34.

(Continued)

*Primary Examiner*—Krisna Lim
(74) *Attorney, Agent, or Firm*—McDonnell Boehnen Hulbert & Berghoff LLP

(57) ABSTRACT

A network management apparatus and method processes network management data received during the monitoring of a network and generates events for presentation in an event list to a user when certain event conditions are detected. Network management data received in relation to an event condition is processed to determine whether it represents a recurring event condition. A recurring event condition is determined if a predetermined number of equivalent events have been generated, and appear in the event list, in an immediately preceding time period. In the described embodiment, if a recurring event condition occurs, a recurring event is generated, and subsequent occurrences of the event condition are not included in the event list presented to the user.

19 Claims, 2 Drawing Sheets

U.S. PATENT DOCUMENTS

| | | | |
|---|---|---|---|
| 5,828,830 A * | 10/1998 | Rangaraian et al. | 714/48 |
| 5,893,083 A * | 4/1999 | Eshghi et al. | 706/45 |
| 5,923,247 A * | 7/1999 | Dowden et al. | 340/506 |
| 6,040,834 A | 3/2000 | Jain et al. | 345/356 |
| 6,044,407 A * | 3/2000 | Jones et al. | 709/246 |
| 6,147,974 A | 11/2000 | Matsumoto et al. | 370/252 |
| 6,167,032 A | 12/2000 | Allison et al. | 370/252 |
| 6,167,403 A * | 12/2000 | Whitmire et al. | 707/10 |
| 6,434,715 B1 * | 8/2002 | Andersen | 714/39 |
| 6,438,184 B1 * | 8/2002 | Nayler | 375/345 |
| 6,438,707 B1 * | 8/2002 | Ronstrom | 714/13 |
| 6,442,694 B1 * | 8/2002 | Bergman et al. | 713/201 |
| 6,473,407 B1 * | 10/2002 | Ditmer et al. | 370/252 |
| 6,487,521 B1 * | 11/2002 | Carney | 702/186 |
| 6,502,131 B1 * | 12/2002 | Vaid et al. | 709/224 |
| 6,505,305 B1 * | 1/2003 | Olarig | 714/5 |
| 6,516,348 B1 * | 2/2003 | MacFarlane et al. | 709/224 |
| 6,553,336 B1 * | 4/2003 | Johnson et al. | 702/188 |
| 6,571,285 B1 * | 5/2003 | Groath et al. | 709/223 |
| 6,574,792 B1 * | 6/2003 | Easton | 717/142 |
| 6,647,517 B1 * | 11/2003 | Dickey et al. | 714/48 |
| 6,816,903 B1 * | 11/2004 | Rakoshitz et al. | 709/226 |
| 6,934,749 B1 * | 8/2005 | Black et al. | 709/224 |
| 6,978,302 B1 * | 12/2005 | Chisholm et al. | 709/224 |
| 6,988,208 B2 * | 1/2006 | Hrabik et al. | 709/208 |
| 7,010,586 B1 * | 3/2006 | Allavarpu et al. | 709/223 |
| 7,127,743 B1 * | 10/2006 | Khanolkar et al. | 726/23 |
| 7,143,153 B1 * | 11/2006 | Black et al. | 709/223 |
| 7,164,694 B1 * | 1/2007 | Nodoushani et al. | 370/467 |
| 7,171,459 B2 * | 1/2007 | Sanghvi et al. | 709/223 |
| 7,177,270 B2 * | 2/2007 | Sim et al. | 370/229 |
| 7,181,519 B2 * | 2/2007 | Pillai et al. | 709/224 |
| 7,185,368 B2 * | 2/2007 | Copeland, III | 726/25 |
| 7,222,147 B1 * | 5/2007 | Black et al. | 709/200 |
| 7,260,610 B2 * | 8/2007 | Grooters et al. | 709/207 |
| 2002/0057018 A1 * | 5/2002 | Branscomb et al. | 307/42 |

FOREIGN PATENT DOCUMENTS

| | | |
|---|---|---|
| EP | 0515296 A1 | 11/1992 |
| EP | 0849910 A2 | 6/1998 |
| EP | 1065894 A1 | 1/2001 |
| GB | 2271918 A * | 4/1994 |
| GB | 2271918 A | 4/1994 |
| GB | 2286317 A * | 8/1995 |
| GB | 2286317 A | 8/1995 |
| GB | 2333672 A | 7/1999 |
| GB | 2350035 A | 11/2000 |
| GB | 2362061 A | 11/2001 |
| GB | 2362062 A | 11/2001 |
| WO | WO 94/19888 | 9/1994 |
| WO | WO 96/04755 | 2/1996 |
| WO | WO 97/31451 | 8/1997 |
| WO | WO 98/19470 | 5/1998 |
| WO | WO 00/13373 | 3/2000 |
| WO | WO 00/47003 | 8/2000 |
| WO | WO 00/72514 | 11/2000 |

OTHER PUBLICATIONS

McMaster et al., "Definitions Of Managed Objects For IEEE 802.3 Repeater Devices", RFC: 1516, Sep. 1993, pp. 1-40.

S. Waldbusser, "Remote Network Monitoring Management Information Base", RFC:1757, Feb. 1995, pp. 1-91.

McCloghrie et al., "Management Information Base For Network Management Of TCP/IP-Based Internets: MIB-II", RFC: 1213, Mar. 1991, pp. 1-70.

IEEE Standard For Information Technology, "Part 2: Logical Link Control", 802.2, 1998, pp. i-239.

IEEE Standard For Information Technology, "Part 3: Carrier Sense Multiple Access With Collision Detection (CSMA/CD) Access Method And Physical Layer Specifications", 802.3, 2000, pp. i-1515.

Lenoir et al., "Real-Time Transmission Network Management And Operation Support System", Commutation & Transmission, vol. 12, No. 3, 1990, pp. 87-98.

S. Waldbusser, "Remote Network Monitoring Management Information Base", RFC 1271, Nov. 1991, pp. 1-81.

S. Waldbusser, "Remote Network Monitoring Management Information Base", RFC 2021, Jan. 1997, pp. 1-114.

* cited by examiner

APPARATUS AND METHOD FOR PROCESSING DATA RELATING TO EVENTS ON A NETWORK

CROSS-REFERENCE TO RELATED APPLICATIONS

The following patent applications filed concurrently herewith are related to the present application and are incorporated herein by reference:
U.S. patent application Ser. No. 09/897,212 entitled "Processing Network Events to Reduce the Number of Events to be Displayed" filed Jul. 2, 2001 and now issued as U.S. Pat. No. 7,010,588;
U.S. patent application Ser. No. 09/897,232 entitled "Network Management Apparatus and Method for Determining Network Events" filed Jul. 2, 2001; and
U.S. patent application Ser. No. 09/897,381 entitled "Network Management Apparatus and Method for Processing Events associated with Device Reboot" filed Jul. 2, 2001 and now issued as U.S. Pat. No. 7,016,955.

BACKGROUND OF THE INVENTION

1. Field of the Invention

The present invention relates generally to an apparatus and method for the management of a network, and more particularly to a network management apparatus and method which monitors a network, and generates Events when certain types of conditions are detected.

2. Description of the Related Art

The following description is concerned with a data communications network, and in particular a local area network (LAN). It will be appreciated, however, that the invention but has more widespread applicability to other managed communications systems including wide area networks (WANs) or wireless communications systems. Networks typically comprise a plurality of computers, peripherals and other electronic devices capable of communicating with each other by sending and receiving data packets in accordance with a predefined network protocol. Each computer or other device on the network is connected by a port to the network media, which in the case of a LAN network may be coaxial cable, twisted pair cable or fibre optic cable. A network is generally configured with core devices having a plurality of ports, which can be used to interconnect a plurality of media links on the network. Such devices include hubs, routers and switches which pass data packets received at one port to one or more of its other ports, depending upon the type of device. Such core devices can be managed or unmanaged.

A managed device is capable of monitoring data packets passing through its ports and obtaining data relevant for network management. Managed devices additionally have the capability of communicating this data using a management protocol such as the SNMP (Simple Network Management Protocol), as described in more detail below. The skilled person will appreciate that the invention is not limited to use with SNMP, but can be applied to managed networks using other network management protocols.

SNMP defines agents, managers and MIBs (where MIB is Management Information Base), as well as various predefined messages and commands for data communication. An agent is present in each managed network device and stores management data and responds to requests from the manager. A manager is present within the network management station of a network and automatically interrogates the agents of managed devices on the network using various SNMP commands, to obtain information suitable for use by the network administrator, whose function is described below. A MIB is a managed "object" database which stores management data obtained by managed devices, and is accessible to agents for network management applications.

It is becoming increasingly common for an individual, called the "network administrator", to be responsible for network management, and his or her computer system or workstation is typically designated the network management station. The network management station incorporates the manager, as defined in the SNMP protocol, i.e. the necessary hardware, and network management software applications to retrieve data from MIBs by sending standard SNMP requests to the agents of managed devices on the network.

A part of the network administrator's function is to identify and resolve problems occurring on the network, such as device or link malfunction or failure. In order to provide the network administrator with the necessary information to identify such problems, the network management application monitors the devices on the network. An example of such monitoring is described in co pending UK Patent Application No 9917993.9 entitled "Management System and Method for Monitoring Stress in a Network" in the name of the present applicant. In the system and method described in UK Patent Application No 9917993.9 the SNMP manager in the network management station requests the agents of managed network devices on the network to retrieve selected MIB data indicative of device and link operation, and performs tests for device activity and service availability. Such MIB data may relate to characteristics such as traffic activity or errors occurring at a particular port in the relevant network device. Tests may include sending ICMP Ping requests to each device on the network, or sending selected requests for services such as SMTP, NFS and DNS to servers, and monitoring the time taken to receive a response. The monitored parameters or characteristics are referred to herein as "stress metrics".

The network management application compares, for each stress metric, the retrieved data or test results against a corresponding threshold level for the stress metric. The threshold level is the level above which performance is considered to be unacceptable.

Each time a threshold is exceeded, the application generates and logs an "event" in memory. An "event log" stores each event, and includes information such as the date and time of the event, the identity of the device affected and the nature of the event. The event list thus provides a history of events which have occurred on the network, and the network administrator can review the event list to identify problems on the network.

In addition to events resulting from the monitoring of stress metrics, events may also be generated by the network management application when other types of condition are detected. For example, a network management application may receive an asynchronous Trap, for example an SNMP Trap from a managed network device. An SNMP Trap is automatically sent by an SNMP agent to the SNMP manager when certain conditions are detected by the agent in the managed device. Examples of conditions which cause SNMP Traps to be sent include "link up" and "link down". When an SNMP Trap is received by the network management station, the management application may log an event.

An example of a known network management software application capable of determining monitoring the stress of a network is the 3Com® Network Supervisor available from 3Com Corporation of Santa Clara, Calif. U.S.A. This application, and similar applications, uses SNMP commands to retrieve relevant management data from managed network devices, and processes the data as described below.

The event log is the main source of information used by the network administrator in order to identify problems on the network. Accordingly, it will be appreciated that the manner of presentation of events to the network administrator in the event list is important. The network administrator needs to be able to identify problems easily and without having to review a long list of insignificant events.

Some network management applications present each event in the event log with a "severity" indication. The severity indication is dependent on the nature of the event and other factors such as the degree to which a stress metric threshold is exceeded. For example, if the threshold for a stress metric is exceeded by a small amount, the severity indication may be "High", if the amount by which the threshold is exceeded is more significant the severity indication may be "Warning" and if the threshold is exceeded by even larger amounts the indication may be "Critical".

Thus, the severity indication enables the network administrator to determine the events which need the most urgent attention. However, this does not address the problem of large numbers of events appearing in the event log.

Another problem encountered by the network administrator in reviewing events in the event log is associated with events generated as a result of an intermittent or "recurring" problem on the network. For example, a problem, such as congestion on a particular link, may occur at certain times of heavy network traffic throughout the day. Each time the link becomes congested, having previously been operating normally, an event is generated. This leads to the event list displaying a large number of identical/equivalent events showing congestion on the link, interspersed between other unconnected events. This can make it difficult for the network administrator to identify and determine that the events indicating congestion on the link are indicative of a single recurring network problem (i.e. a recurring problem on a specific, single network device or link). In addition, the inclusion of a separate event on each occurrence of a recurring problem may obscure other unrelated, yet more significant events.

The present invention seeks to address these problems.

In the aforementioned co-pending U.S. Patent Application entitled "Processing Network Events to Reduce the Number of Events to be Displayed" filed simultaneously herewith, there is described a method and apparatus in which events generated by a network management system are passed through one or more "event processors" to correlate events prior to presentation in an event list. Each processor is adapted to correlate certain types of events which may be generated as a result of certain conditions or problems on the network. This correlation ensures that the number of events presented in the event list is reduced, by avoiding presenting certain types of event which, generally speaking, are less informative about network conditions and problems to the user.

SUMMARY OF THE INVENTION

The present invention provides a method which may be implemented by one such event processor, and an apparatus which may comprise such an event processor.

Generally, the present invention provides a network management apparatus and method which identifies and correlates recurring, that is repeatedly occurring, events. In accordance with a first aspect, the present invention provides a method for processing events generated by a network management system during the monitoring of a network for presentation in an event list to the user, the method comprising receiving an event, and determining if a predetermined number of equivalent events have been generated in a preceding time period.

If it is determined that a predetermined number of equivalent events have been generated in an immediately preceding time period, the event is considered to be a recurring event.

In a preferred embodiment, if a recurring event is determined, the method generates an event marked as recurring for presentation in the event list. In addition, the method prevents subsequent equivalent events from being presented in the event list to the user. This avoids the presentation of further occurrences of the recurring event to the user.

In one embodiment, if a recurring event is determined following the receiving of the event, the method includes in the event data of the event marked recurring a second time (e.g. a "time stamp") corresponding to the time of the received event to represent the time of the last or most recent occurrence of the event. If a subsequent occurrence of the event is received, this time is updated to the time of the subsequent event.

In accordance with a second aspect, the present invention provides a computer readable medium including a computer program for carrying out the method in accordance with the first aspect of the present invention.

In accordance with a third aspect, the present invention provides a network management apparatus for generating events during the monitoring of a network, and for presenting the generated events in an event list to the user, the apparatus comprising a processor for receiving an event, and for determining if a predetermined number of equivalent events have been generated in a preceding time period.

BRIEF DESCRIPTION OF THE DRAWINGS

Embodiments of the present invention will now be described, by way of example, with reference to the accompanying drawings, in which.

DESCRIPTION OF THE PREFERRED EMBODIMENTS

Figure 1:
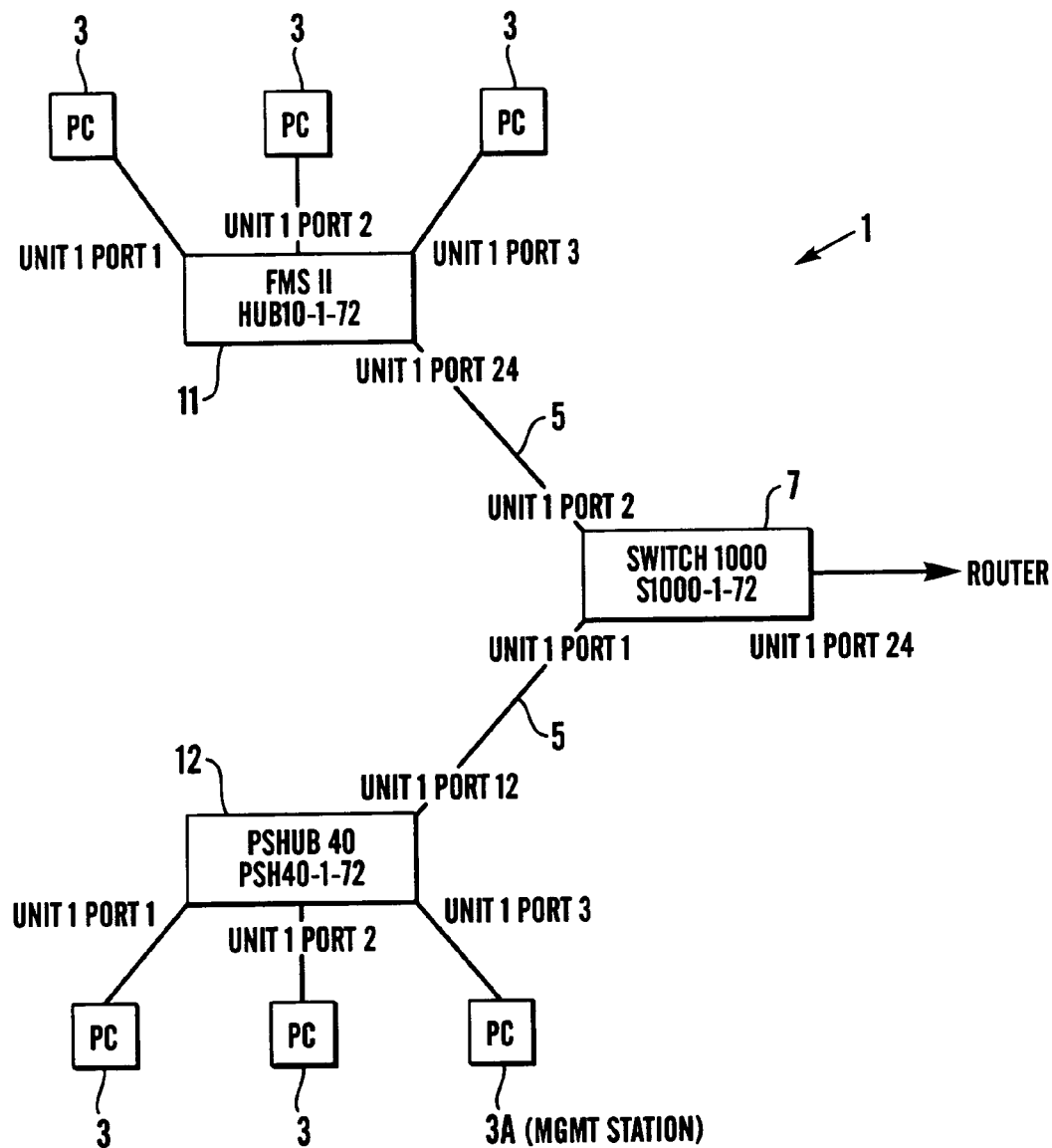
FIG. 1 is a block diagram of a typical network having a network management station which may be employed in accordance with the present invention.

FIG. 1 shows a typical network 1 incorporating a network management system according to a preferred embodiment of the present invention. The network 1 includes a network management station 3A which incorporates the necessary hardware and software for network management. In particular, the network management station 3A includes a processor, a memory and a disk drive as well as user interfaces such as a keyboard and mouse, and a visual display unit. Network management application software in accordance with the present invention is loaded into the memory of management station 3A for processing data as described in detail below. The network management station 3A is connected by network media links 5 to a plurality of managed network devices including core devices such as network switch 7, hubs 11 and 12, and a router (not shown) which may be managed or unmanaged, and end stations including personal computers (PCs) 3 and workstations. The network may also include unmanaged devices, for example peripheral devices such as printers.

The network management station 3A is capable of communicating with the managed network devices such as network switch 7 and hubs 11 and 12 by means of a network management protocol, in the present embodiment the SNMP protocol, in order to obtain network management data. Each managed device includes an SNMP agent which monitors operational characteristics and stores the monitored data as MIB data in memory on the device, as is well known in the art, including data relating to inter alia data traffic passing through the device.

In accordance with the preferred embodiment of the present invention, the network management station 3A monitors a plurality of stress metrics. The stress levels or values for the metrics are obtained by periodically requesting relevant MIB data from hubs 11 and 12 and switch 7, and by periodically polling all network devices using Ping or service requests and monitoring response times.

The network management station 3A compares each monitored stress level against a corresponding predetermined threshold level for the stress metric. Each time a threshold is exceeded, the network management station 3A stores details about the monitored stress level in an event log in memory. In particular, the event data stored in the event log includes the time of the event (e.g. by way of a "time stamp"), the identity of the device concerned, the identity of the stress metric and the severity of the event.

The memory typically stores the event data in the form of a database or similar data file, which stores event data in different time intervals separately. Thus, the database provides a history of events that have occurred on the network for different time periods. It should be noted that monitored stress levels which do not exceed the threshold are not stored in the event log, in accordance with the preferred embodiment, and the received data about these monitored levels is discarded or overwritten by subsequent monitored stress levels. It will be appreciated that in other embodiments all monitored stress levels for some or all time intervals may be stored in the database.

A typical list of events recorded in an event log is shown in Table 1 below. Each event listed in the Table represents an event which has been generated as described above.

TABLE 1

| Time | Device | Event Condition | Severity |
| --- | --- | --- | --- |
| 2.00 | switch 7, port 1 | link errors | Warning |
| 2.03 | switch 7, port 1 | link errors | Warning |
| 2.04 | switch 7, port 1 | link errors | Warning |
| 2.06 | switch 7, port 1 | link errors | Warning |
| 2.08 | switch 7, port 1 | link errors | Warning |
| 2.10 | hub 11, port 2 | link congestion | High |
| 2.10 | switch 7, port 1 | link errors | Warning |
| 2.14 | switch 7, port 1 | link errors | Warning |
| 2.15 | hub 11, port 2 | device down | High |
| 2.16 | switch 7, port 1 | link errors | Warning |
| 2.20 | switch 7, port 1 | link errors | Warning |

In the example illustrated in Table 1, the event log repeatedly logs an error on the link to port 1 of switch 7. Other types of error which may recur repeatedly over time include: repeated congestion on a particular link; slow provision of service by a network server device, and repeated failure by a network device to respond to a management request (e.g. IP Ping request). The skilled person will appreciate that other types of errors may also occur intermittently with time and lead to repeated event generation.

The recurrence of the event in Table 1, indicating errors on the link connected to port 1 of switch 7, represents an intermittent, recurring problem with the link. In particular, in this example, the link is monitored every 30 seconds, and so it can be deduced from the event log that the link was operating normally, for example, between 2.00:30 and 2.02:30 and at 2.05. The event list shown in Table 1 is thus cluttered with events due to this recurring network problem which obscure more significant errors such as the problems with hub 11 at 2.10 and 2.15.

The present invention avoids including so many events, which are repeatedly generated due to an intermittent problem on the network, for presentation in the event list to the user.

Figure 2:
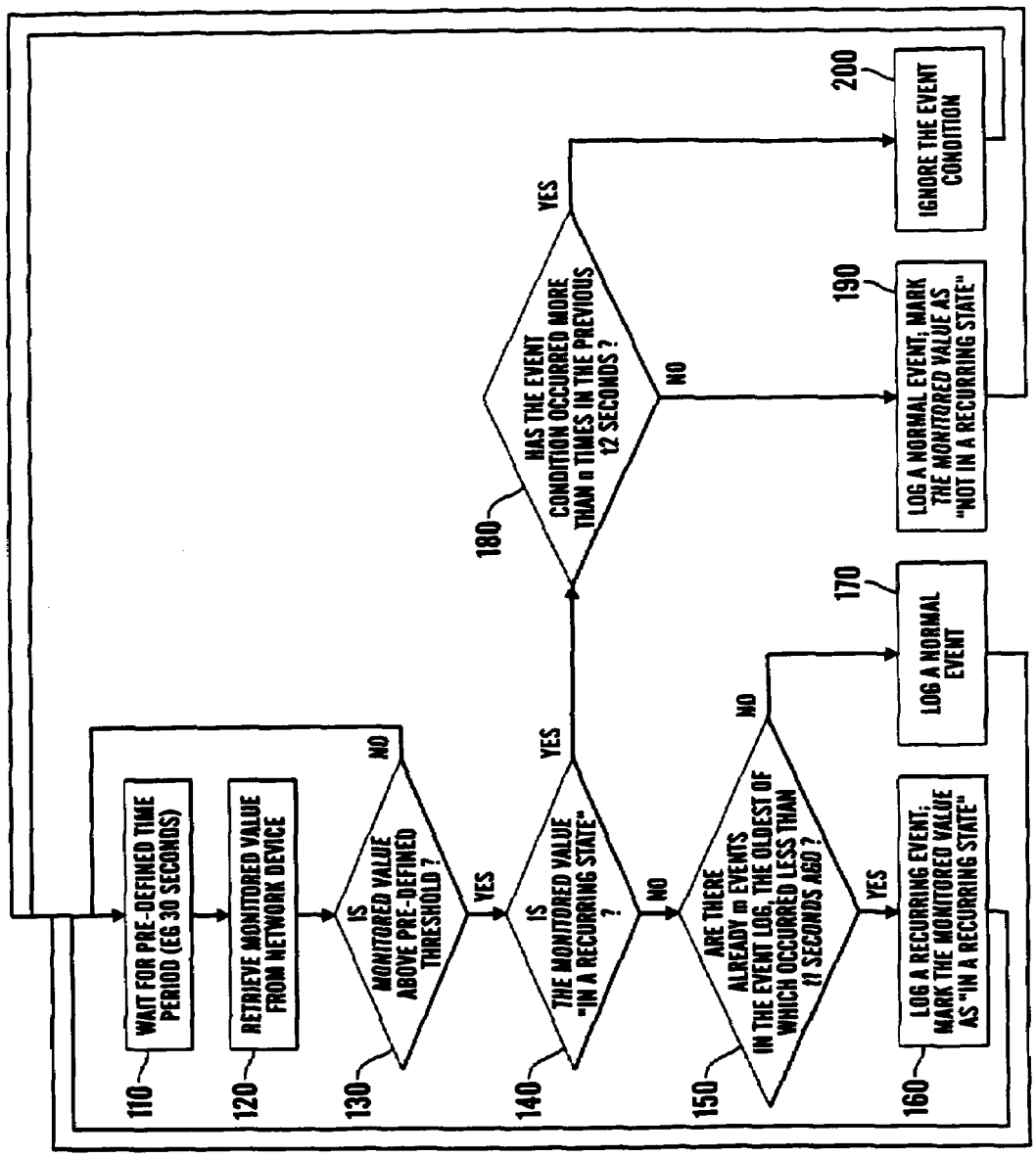
FIG. 2 is a flow diagram illustrating the steps of a computer program for carrying out a method in accordance with a preferred embodiment of the present invention.

FIG. 2 shows a method in accordance with an embodiment of the present invention. The method is implemented in a computer program forming part of network management software application. It will be appreciated that in other embodiments the method may be implemented in other forms such as in hardware.

In particular, the method of the preferred embodiment is performed in a network management station in accordance with the present invention. The network management station 3A comprises a processor, a disk drive, memory, and user interfaces including a display screen, keyboard, mouse, and a printer. The computer program described above is typically provided on a computer readable medium, such as a disk, and is loaded onto the network management station using the disk drive and the processor runs the program. Alternatively, the computer program may be carried on a computer system having the website of, for example, the supplier of network devices, which permits downloading of the program over the Internet on a carrier wave to the network management station 3A.

The program illustrated in FIG. 2 relates to a particular monitored characteristic for a particular network device. Network management data including the value (level) of the monitored characteristic (stress metric) is retrieved periodically by the network management software application. For example, the data may be retrieved at regular time intervals of 30 seconds. It will be appreciated that other time intervals are possible.

Thus, at step 110, the program waits for a predefined time period corresponding to the aforementioned time interval. In the preferred embodiment, the predefined time period is 30 seconds.

At step 120, the program retrieves the value of the monitored characteristic of the relevant network device, and at step 130 considers whether the value is above a predefined threshold for the monitored characteristic.

It will be appreciated that steps 110 to 130 may be implemented by a conventional network management software application.

If step 130 determines that the value received at step 120 is not above the predefined threshold, the program returns to step 110 and waits for 30 seconds before retrieving the next value for the monitored characteristic.

If step 130 determines that the value received at step 120 is above the predefined threshold, an event condition has occurred and the program passes data relating to the event condition to step 140 for processing.

At step 140, the program considers whether the monitored characteristic for the relevant network device is in a recurring state. In particular, the program considers whether a corresponding existing event appears in the event log which is marked as "recurring". The manner in which events are marked as recurring is described below in relation to steps 150 and 160.

If step 140 determines that the monitored characteristic is in a recurring state, the program proceeds to step 180. Otherwise, that is, if step 140 determines that the monitored characteristic is not in a recurring state, the program proceeds to step 150

At step 150, the program considers whether there are already m corresponding existing events in the event log, the oldest of which occurred in the previous time period of t1 seconds (where m and t1 are integer values greater than 0). In the preferred embodiment, the value of m=4 and the value of t1=7200 (time period=2 hours). It will be appreciated that other values for m and t1 are possible, and contemplated. However, m is typically in the range of 3 to 7 and t1 is typically several hours.

In particular, at step 150, the program scans the event log for events in which the event data indicates a corresponding event with a time stamp in the immediately preceding time interval t1. It will be appreciated that the instead of scanning data in the event log, the network management application could maintain internal "state" information relating to events in the event log, typically stored as variables or lists for use when processing subsequent events.

If step 150 determines that there are already m corresponding events in the event log, the oldest of which occurred in the preceding t1 seconds, the program proceeds to step 160. Otherwise, the program proceeds to step 170 by logging the event in the event log. In step 170, the event is logged as a normal event.

At step 160, since the event condition has now occurred more than m times in the last t1 seconds, the program logs a recurring event. In particular, in the preferred embodiment, the program generates a new event for the monitored value received at step 120 which is marked as "recurring" and logs it in the event log. In addition, an internal state of the monitored characteristic may be marked "recurring", e.g. by setting a variable to indicate a recurring state. As the skilled person will appreciate, an event may be marked as in a recurring state in a number of different ways, but in the preferred embodiment, the severity indication in the event data is given accorded a special state or code, which appears in the event list as "recurring".

In addition, the event data for recurring events may include an additional time stamp to indicate the most recent occurrence of the event, as will be appreciated from the following description.

Following step 160, the program returns to step 110.

Returning to step 140, if step 140 determines that the monitored value is in a recurring state, then, at step 180, the program scans the event log and considers whether the event condition has occurred more than n times in the previous time period t2 (where n and t2 are integer values greater than 0). In the preferred embodiment, n=1 and t2=14400 seconds (time period=4 hours). The skilled person will appreciate that other values for n and t2 are possible, and, like m and t1 should be chosen according to the operating characteristics of the network management software application and depending upon the type of monitored characteristic involved. Again, it will be appreciated that instead of scanning the event log, the network management application could maintain internal "state" information relating to events in the event log, typically stored as variables or lists for use when processing subsequent events.

If step 180 determines that the event condition has occurred more than n times in the preceding time period t2, then it is considered that the event remains a recurring event and the program proceeds to step 200. Alternatively, if step 180 determines that the event condition has not occurred more than n times in the preceding time period t2, then the event is no longer considered to be a recurring event and the program proceeds to step 190.

At step 200, the program may not generate an event in response to the event condition indicated by the monitored value retrieved by step 120, but instead ignores the event condition, for presentation purposes. However, the event data is logged in memory in the preferred embodiment, so that the data can be looked at during subsequent scanning steps 150 or 180. In this case the data is hidden from the user, and not presented in the event list. In the preferred embodiment, in addition to ignoring the event condition, the program updates the additional time stamp in the recurring event with the current time, so that the additional time stamp indicates the most recent time that the event condition occurred.

Following step 200, the program returns to step 110.

At step 190, the program logs an event in the event log. A normal event is logged for the monitored value received at step 120, that is, it is not marked in the recurring state. Thus, in the preferred embodiment, the severity of the event is recorded in the conventional manner depending upon the value and the threshold. In addition, if the state of the monitored characteristic is maintained internally at step 190 it is changed from recurring to non-recurring.

Following step 190, the program returns to step 110.

The following Table 2 illustrates the events that will appear in the event list when the program illustrated in FIG. 2 is applied to the data relating to the events received and illustrated in Table 1 above.

TABLE 2

| Time | Device | Event Condition | Severity |
|------|--------|-----------------|----------|
| 2.00 | switch 7, port 1 | link errors | Warning |
| 2.03 | switch 7, port 1 | link errors | Warning |
| 2.04 | switch 7, port 1 | link errors | Warning |
| 2.06 | switch 7, port 1 | link errors | Warning |
| 2.08 | switch 7, port 1 | link errors | Recurring |
| 2.10 | hub 11, port 2 | link congestion | High |
| 2.15 | hub 11, port 2 | device down | High |

Thus, it can be seen that the number of events relating to link errors on the link to port 1 of Switch 7 is reduced, due to the fifth occurrence of the event condition at 2.08 being marked as a recurring event. In addition, since subsequent occurrences do not appear in the event list, the unrelated events at 2.10 and 2.15 are no longer obscured by individually logged instances of the recurring event condition. The network administrator is therefore provided with a better indication of the state of the network.

As the skilled person will appreciate, various modifications and changes may be made to the described embodiments.

For example, steps 180 and 190 of the preferred embodiment may be omitted. Thus, if step 140 determines that the monitored characteristic is in a recurring state, the program will simply proceed to step 200 and ignore the event condition.

As an alternative to step 160, the program may instead ignore the event condition resulting from the value received at step 120, and instead update the most recent of the m existing events by marking it as recurring, or changing its severity indication to recurring. In addition, a time stamp may be added to the data from that event, indicating the current time and thus the time of the most recent occurrence of the event condition.

The present invention is not limited to use in relation to monitored characteristics in which an event condition arises if a monitored value exceeds a predefined threshold. Rather steps 140 to 200 of the preferred embodiment can be adapted for use with other types of monitored characteristics.

It is intended to include all such variations, modifications and equivalents which fall within the spirit and scope of the present invention as defined in the accompanying claims.

The invention claimed is:

1. In a network management apparatus communicatively coupled to a network, a method for processing network management data and logging events for presentation in an event log display to a user when event conditions are detected during monitoring of a network, the method comprising:

receiving a given event condition from the network;

logging to the event log display a normal event log entry corresponding to the given event condition, upon a determination that fewer than a first number of event log entries each corresponding to an event condition equivalent to the given event condition have been logged to the event log display during a first time period;

logging to the event log display an event log entry corresponding to the given event condition and marking the event log entry as a recurring event log entry, upon a determination that at least the first number of event log entries each corresponding to an event condition equivalent to the given event condition have been logged to the event log display during the first time period; and excluding from the event log display an event log entry corresponding to a particular event condition, upon a determination that (i) a recurring event log entry corresponding to an event condition equivalent to the particular event condition has already been logged and (ii) at least a second number of event conditions equivalent to the particular event condition have been received during a second time period.

2. A method as claimed in claim 1, wherein marking the event log entry as a recurring event log entry comprises adding a time stamp to the recurring event log entry, the time stamp indicating a time of occurrence of the given event condition.

3. A method as claimed in claim 1, wherein the first time period immediately precedes receipt of an event condition.

4. The method of claim 1, wherein the network management data is Simple Network Management Protocol (SNMP) management data, and the given event condition is an SNMP event condition.

5. In a network management apparatus communicatively coupled to a network, a method for processing a network management data and logging events for presentation in an event log display to a user when event conditions are detected during monitoring of a network, the method comprising:

receiving network management data from the network indicating that a given event condition has occurred;

determining whether a monitored characteristic of the given event condition is in a recurring state, a recurring state corresponding to a presence in the event log display of a recurring event log entry that includes an indication of at least a first number of event conditions, each equivalent to the given event condition, having been received during a first time period;

responsive to determining that the monitored characteristic is in a recurring state, determining whether the given event condition has occurred more than a second number of times during a second time period; and responsive to determining that the monitored characteristic is in a recurring state and that the given event condition has occurred more than a second number of times during a second time period preventing the received network management data from being presented in the event log display to the user.

6. A method as claimed in claim 5, further comprising: responsive to determining that the monitored characteristic is in a recurring state, adding to the recurring event log entry a time stamp marking a time at which the network management data was received.

7. A method as claimed in claim 5, further comprising: responsive to determining that the monitored characteristic is in a recurring state and that the given event condition has not occurred more than a second number of times during a second time period, generating normal event entry for presentation in the event log display to the user.

8. A method as claimed in claim 7, wherein the generated normal event log entry is not a recurring event log entry.

9. A method as claimed in claim 5, further comprising: responsive to determining that the monitored characteristic is not in a recurring state, determining whether at least the first number of event conditions, each equivalent to the given event condition, has been received during the first time period.

10. A method as claimed in claim 9, further comprising: responsive to determining that at least the first number of event conditions, each equivalent to the given event condition, has been received during the first time period, generating a recurring event log entry in the event log display.

11. A method as claimed in claim 10, further comprising: subsequent to generating a recurring event log entry in the event log display, receiving particular network management data indicating that a particular event condition has occurred, the particular event condition being equivalent to the given event condition; and preventing the particular network management data from being presented in the event log display to the user.

12. A method as claimed in claim 11, further comprising: adding to the recurring event log entry a time stamp marking a time at which the particular network management data was received.

13. A method as claimed in claim 9, further comprising: responsive to determining that fewer than the first number of event conditions, each equivalent to the given event condition, has been received during the first time period, generating a normal event entry for presentation in the event log display to the user.

14. A method as claimed in claim 9, wherein each of the first time period and the second time period precedes receipt of the network management data.

15. The method of claim 5, wherein the network management data is Simple Network Management Protocol (SNMP) management data, and the given event condition is an SNMP event condition.

16. A tangible computer readable medium having stored thereon computer-executable instructions that, if executed by a network management apparatus, cause the network management apparatus to perform a method comprising:

receiving a given event condition from the network;

logging to the event log display a normal event log entry corresponding to the given event condition, upon a determination that fewer than a first number of event log entries each corresponding to an event condition equivalent to the given event condition have been logged to the event log display during a first time period;

logging to the event log display an event log entry corresponding to the given event condition and marking the event log entry as a recurring event log entry, upon a determination that at least the first number of event log entries each corresponding to an event condition equivalent to the given event condition have been logged to the event log display during the first time period; and excluding from the event log display an event log entry corresponding to a particular event condition, upon a determination that (i) a recurring event log entry corresponding to an event condition equivalent to the particular event condition has already been logged and (ii) at least a second number of event conditions equivalent to the particular event condition have been received during a second time period.

17. The tangible computer readable medium of claim 16, wherein the given event condition is an SNMP event condition.

18. A network management apparatus configured for monitoring a network, processing network management data and logging events for presentation in an event log display to a user when event conditions are detected, the apparatus comprising:

a processor; and memory configured to store computer-executable instructions that, if executed by the processor, cause the network management apparatus to perform functions comprising:

receiving a given event condition from the network;

logging to the event log display a normal event log entry corresponding to the given event condition, upon a determination that fewer than a first number of event log entries each corresponding to an event condition equivalent to the given event condition have been logged to the event log display during a first time period;

logging to the event log display an event log entry corresponding to the given event condition and marking the event log entry as a recurring event log entry, upon a determination that at least the first number of event log entries each corresponding to an event condition equivalent to the given event condition have been logged to the event log display during the first time period; and excluding from the event log display an event log entry corresponding to a particular event condition, upon a determination that (i) a recurring event log entry corresponding to an event condition equivalent to the particular event condition has already been logged and (ii) at least a second number of event conditions equivalent to the particular event condition have been received during a second time period.

19. The network management apparatus of claim 18, wherein the network management data is Simple Network Management Protocol (SNMP) management data, and the given event condition is an SNMP event condition.

* * * * *